May 17, 1932.  G. L. STRAUGHAN  1,858,346
MAGNETIC FLUID LEVEL GAUGE
Filed March 5, 1930  2 Sheets-Sheet 1

George L. Straughan,
Inventor
Attorneys.

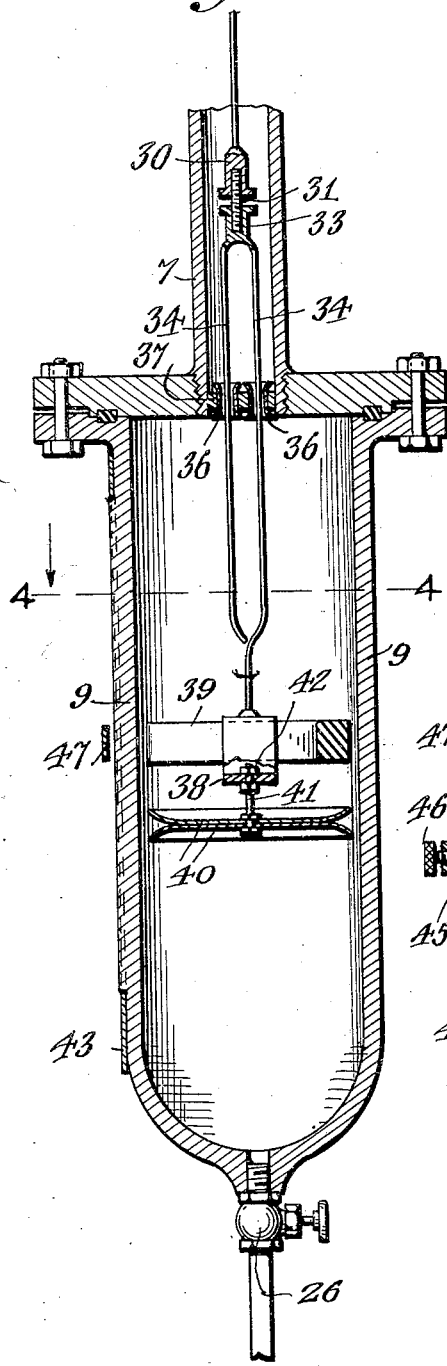

Patented May 17, 1932

1,858,346

UNITED STATES PATENT OFFICE

GEORGE L. STRAUGHAN, OF CHESAPEAKE, WEST VIRGINIA

MAGNETIC FLUID LEVEL GAUGE

Application filed March 5, 1930. Serial No. 433,343.

This invention aims to provide a simple but efficient mechanism whereby the level in a high-pressure boiler, or in any other container, may be ascertained and made manifest by an audible signal, a visible signal, or both. Another object of the invention is to provide novel magnetic means whereby a reading may be obtained on a dial, as the liquid in a container rises and falls.

It is within the province of the disclosure to improve generally and to enhance the utility of devices of that type to which the present invention appertains.

With the foregoing and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawings:

Figure 3 is a section on the line 3—3 of Figure 1;

Figure 4 is a section on the line 4—4 of Figure 3;

Figure 5 is a detailed sectional view illustrating the lever and attendant parts.

Figure 1:
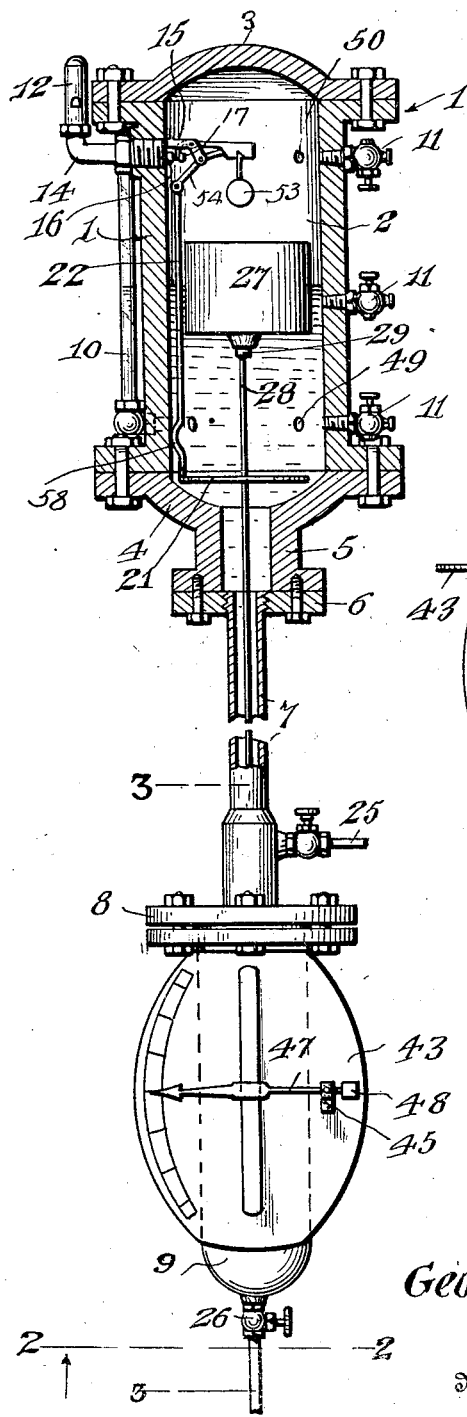
Figure 1 shows in longitudinal section, a device constructed in accordance with the invention, parts being broken away.
Figure 2:
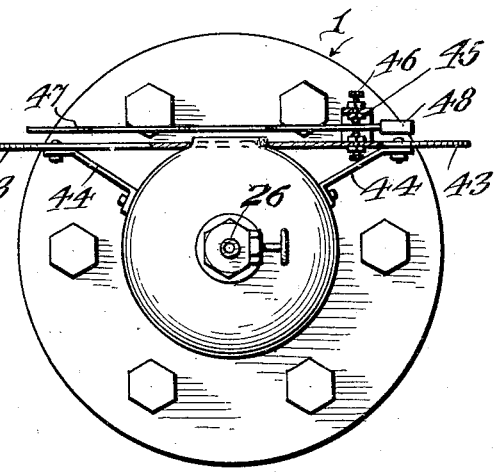
Figure 2 is a section on the line 2—2 of Figure 1.

In carrying out the invention, there is provided a receptacle 1, which, as a whole, is designated by the numeral 1. The receptacle 1 comprises a float chamber 2 having a removable lid 3 and a removable base 4, the base 4 having a reduced neck 5 carrying a detachable head plate 6 into which is threaded a tube 7, the tube 7 being threaded into a foot plate 8 detachably secured to a magnet casing 9, the receptacle 1 carrying a gauge glass 10 and gauge cocks 11.

Assuming that the device is to be used on a steam boiler, the liquid inlet is marked by the numeral 49 in Figure 1, and the steam inlet is designated by the numeral 50. The tube 7 has a drain 25 under the control of an operator, and in the bottom of the magnet casing 9 there is a drain 26 also under the control of an operator.

The numeral 12 designates an audible signal, such as a whistle. The signal 12 is carried by a coupling 14 mounted in the float chamber 2. The float chamber 2 carries an internal bracket 15. The coupling 14 forms a mounting for a valve 16. The stem of the valve 16 has a head 17 located within the float chamber 2. A first lever 18, shown in detail in Figure 5, is fulcrumed intermediate its ends at 19 on the bracket 15. The first lever 18 has a depending inner end 20 engaged behind the head 17 on the stem of the valve 16. The first lever 18 has a trough-shaped end 50. A cross piece 51 extends across the trough-shaped end 50 of the lever 18. The numeral 53 marks a weight or projection, connected by a rigid stem 52 with the cross piece 51.

The numeral 54 marks a second lever. One end of the second lever 54 extends within the trough-shaped end 50 of the first lever 18. The second lever 54 is fulcrumed intermediate its ends at 55 on the downwardly extended end of the bracket 15. The numeral 21 marks a horizontal yoke arranged in the bottom of the float chamber 2. The yoke 21 has an upright 56 that is pivoted at 57 to one end of the second lever 54. The upright 56 of the yoke 21 is provided with a laterally offset projection 58 which slides on the inner surface of the float chamber 2 and keeps the yoke 21 in an approximately horizontal position.

A float 27 is mounted in the float chamber 2. A connection is provided, the connection including a rod 28 threaded into the lower end of the float 27 and held in adjusted positions by means of a lock nut 29. On the lower end of the rod 28 there is an enlargement 30, as Figure 3 will show. The upper end of a screw 31 is threaded into the enlargement 30. The lower end of the screw 31 is threaded into a button 33, to which are connected depending arms 34 mounted to reciprocate in guides 36 carried by a partition 37 in the tube 7. On the lower end of one of the arms 34, there is a holder 38 in which is mounted a horizontal permanent magnet 39 located in the magnet casing 9. Below the magnet 39 are oppositely disposed concaved discs 40 mounted on a hanger 41 which is secured at 42 to the holder 38. The discs 40 act as a dash pot, as will be explained hereinafter.

A dial 43 is held by braces 44 on the outside of the magnet casing 9. On the dial 43 is a bracket 45. Pivot screws 46 are mounted in the bracket 45 and in the dial 43. An arm 47 cooperates with the dial 43. The arm 47 is mounted intermediate its ends to swing on the pivot screws 46, as Figure 4 will show. At one end, the arm 47 carries a counterweight 48.

All parts of the mechanism preferably are made of non-magnetic metal, excepting the magnet 39 and the arm or indicator 47. As the float 27 rises and falls, responsive to changes of liquid level in the float chamber 2, the magnet 39 is raised and lowered. The magnet attracts the indicator 47 and causes the indicator to swing up and down, the indicator cooperating with the dial 43 to constitute a visible signal showing how the water stands in the float chamber.

When the water in the float chamber 2 reaches a low level, the float 27 engages the yoke 21 and pulls the yoke down, the second lever 54 being tilted on its fulcrum 55, the right hand end of the lever 54 rising in Figure 5, and tilting the lever 18 on its fulcrum 19, the end 20 of the lever 18 cooperating with the head 17 on the valve stem 16 to open the valve and admit steam to the signal 12. The operator, thus, is admonished that a low level has been reached. In the event that the water rises unduly in the chamber 2, the float 27 engages the weight or projection 53 and swings the right hand end of the lever 18 upwardly in Figure 5, the signal 12 being operated as described in connection with the second lever 54 and the yoke 21.

As the float 27 moves up and down, the connection 29—34 is raised and lowered, the magnet 39 being raised and lowered also, the discs 40 serving to steady the upward and downward movement of the magnet. As the magnet 39 moves up and down, the arm or indicator 47 is swung on its pivotal mounting 46, and the indicator, cooperating with the graduations on the dial 43, gives the necessary information to the operator as to the level of the liquid.

Having thus described the invention, what is claimed is:—

1. In a device of the class described, a receptacle, a lid, means for securing the lid on the upper end of the receptacle, a signal, a valve carried by the receptacle in spaced relation to the lid and admitting pressure to the signal from the receptacle, a bracket located on the receptacle and spaced from the lid, a first lever fulcrumed intermediate its ends on the bracket and engaged at its inner end with the valve, a second lever located below the first lever and fulcrumed intermediate its ends on the bracket, and having its outer end loosely engaged within the outer end of the first lever, a yoke connected to the inner end of the second lever and extended downwardly within the receptacle, and a float in the receptacle, the float being movable between the outer end of the first lever on the one hand, and the yoke on the other hand.

2. In a device of the class described, a receptacle, means for supplying liquid to the receptacle, a magnet casing located below the receptacle, means for conducting liquid by gravity from the receptacle to the casing to fill the casing, a float movable in the receptacle, a magnet in the casing and immersed in the liquid therein, a connection between the float and the magnet and guided in said means, a dash pot mechanism in the casing and movable in the liquid in the casing, means for mounting the dash pot mechanism for movement with the magnet, and a signal external to the casing and responsive to the magnet.

In testimony that I claim the foregoing as my own, I have hereto affixed my signature.

GEORGE L. STRAUGHAN.